Figure 2:
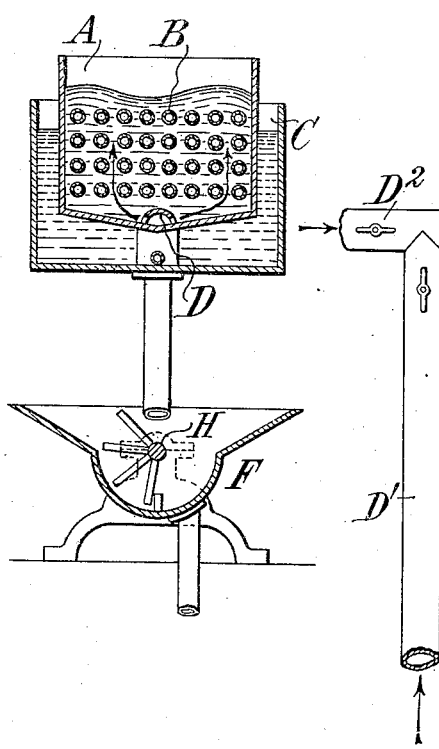

No. 879,514. PATENTED FEB. 18, 1908.
C. H. CAMPBELL.
CONCENTRATED WHOLE MILK.
APPLICATION FILED DEC. 14, 1905.

WITNESSES:
Fred White
Rene' Muine

INVENTOR:
Charles H. Campbell,
By Attorneys,
Arthur E. Frazer Co.

UNITED STATES PATENT OFFICE.

CHARLES H. CAMPBELL, OF NEW YORK, N. Y.

CONCENTRATED WHOLE MILK.

No. 879,514.  Specification of Letters Patent.  Patented Feb. 18, 1908.

Application filed December 14, 1905. Serial No. 291,724.

*To all whom it may concern:*

Be it known that I, CHARLES H. CAMPBELL, a citizen of the United States, residing in the borough of Manhattan, city, county, and State of New York, have invented certain new and useful Improvements in Concentrated Whole Milk, of which the following is a specification.

This invention aims to provide a new food product consisting wholly or chiefly of milk concentrated to the consistency of a thick fluid similar in general to ordinary condensed milk, and containing a quantity of cream in substantially the same form as in fresh milk, so that when the product is rediluted to the consistency of fresh milk, the cream will rise therein as in fresh milk; and a process of making the product in such a way as to preserve the cream in its original condition, not only as regards color, taste and chemical characteristics, but also as regards its physical form.

The concentrated or "condensed" milk of commerce contains more or less cream. In the process of concentration, however, the whole milk, or milk containing the desired percentage of cream, is subjected to the treatment from beginning to end. The process of concentration necessarily involves, either incidentally or intentionally, a considerable agitation, which breaks up the cream globules into minute particles and disseminates these particles throughout the mass, so as to form an emulsion in which the fatty and non-fatty matters are so closely intermixed as to be practically inseparable even when the milk is rediluted to its original consistency. Thus it is impossible for an ordinary user to know how much or how little cream there is in the concentrated milk.

According to this invention the cream or the greater portion thereof is separated from the milk before the latter is subjected to the concentrating process, and is returned to the milk after the latter is thickened to say one-fourth or one-fifth of its original consistency, only sufficient agitation being effected to mix in the cream thoroughly, but not to destroy materially the form or size of the globules. The mass, being much thicker than the original milk, holds the cream firmly and prevents its rising. Thus the cream will not be automatically separated and exposed to the air, but will be firmly held disseminated throughout the body of the concentrated milk and will keep in good condition as long as the remaining portions of the milk, that is to say, practically indefinitely when properly packed. When the concentrated milk is to be used, however, it may be rediluted to its original consistency, whereupon by allowing it to stand a short time the cream globules, being in a thinner medium, will rise freely, and will collect on the top substantially the same as in fresh milk, thus enabling the consumer to see for himself in the usual way that the product contains all or a substantial proportion of the cream found in fresh milk. The quantity of cream in fact may be made greater or less than the normal, as desired. Such a condensed milk is of the greatest value, especially in those countries where rich fresh milk is rare and to which my improved product may be transported freely.

The general nature of the product having been indicated, I will describe at length a particular process for obtaining the product, and with reference to the accompanying more or less diagrammatical drawings, in which—

Figure 1:
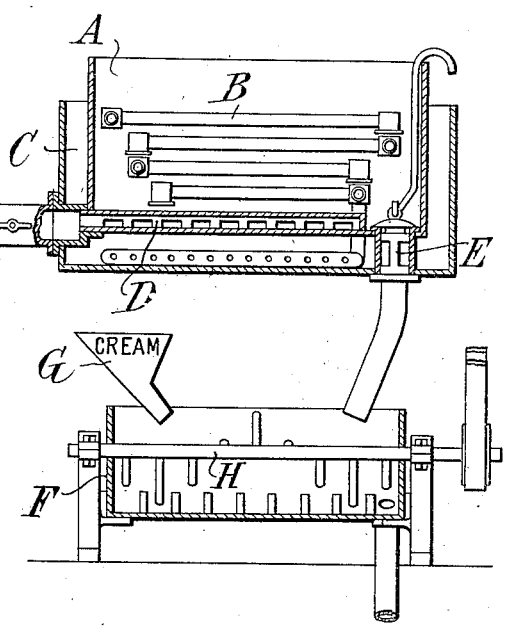

Figure 1 is a longitudinal, and Fig. 2 a transverse, section through parts of the apparatus.

The process described is not claimed in this application, being a part of the process of my reissued patent No. 12,649 of May 14, 1907.

The skim-milk (by which I mean milk from which a greater or less proportion of the cream has been removed, limited ordinarily by the ease of removal) is put into a concentrating tank A, where it is maintained at a desired evaporating temperature, preferably below the coagulating point of albumen, by means of hot water circulated through coils B and a jacket C, and is exposed at the same time to a blast of air through the perforated pipe D, the volume of air supplied depending upon the applied temperature and the desired temperature of the milk. The blast of air carries off the heated vapor produced, and maintains the milk at a temperature below that of the applied heat. This difference in temperature in turn hastens the process, the external heat being continually taken up by the milk and carried off with a portion of the vapor by the blast of air. After concentrating the milk to substantially the desired degree in the tank A, the valve E is opened to let the milk into a mixer E into which also cream is conducted from a hopper G.

The shaft H is rotated, and its arms stir and mix the product, being assisted in this function by the pins projecting inward from the lower wall of the vessel. Preferably the concentration is entirely completed in the first tank A, and the consistency of the product is unaltered in the second tank F except in so far as the thinner or thicker cream thins or thickens the mass.

I may, if desired, use sterilized air in carrying out the first stage of my process. In such case the milk during the first or concentrating stage of the process may be, and preferably is, rendered entirely sterile, and when the cream has been added the mixture will contain only the bacteria of the cream, these being the bacteria which are desirable in order to obtain the flavor of the cream in the final product.

Instead of adding cream to the partly-concentrated milk, I may obtain the desired flavor in the final product by separating out from the cream the particular bacteria which gives it its attractive flavor and by adding this bacteria to the milk. Such addition may take place after any degree of partial concentration, it being only necessary that the subsequent treatment shall not be such as to seriously injure the added bacteria. Such bacteria are now well-known manufactured products.

The concentration which constitutes the first part of the process is not necessarily carried out in the manner described. Any suitable concentrator and concentrating process may be employed, such, for example, as the well known vacuum process.

The pipes D' and D² in Fig. 1 are for the alternative use of hot air or cold air, as preferred.

Though I have described with great particularity of detail certain embodiments of the invention, yet it is not to be understood therefrom that the invention is limited to the particular embodiments described.

Various modifications thereof may be made by those skilled in the art without departure from the invention.

What I claim is:—

1. A food product consisting of a mixture of concentrated milk and raw unconcentrated cream in the form of a stable substantially uniform emulsion but with the fat globules substantially unbroken, so that when the product is diluted to the consistency of fresh milk cream will rise therein as in fresh milk.

2. A food product consisting of a mixture of raw unconcentrated cream with skim milk concentrated to approximately one-fourth of its original consistency, the quantity of cream being approximately the same as that originally separated from the milk and the mixture being in the form of a stable substantially uniform emulsion but with the fat globules substantially unbroken, so that when the product is diluted to the consistency of fresh milk cream will rise therein as in fresh milk.

In witness whereof, I have hereunto signed my name in the presence of two subscribing witnesses.

CHARLES H. CAMPBELL.

Witnesses:
   DOMINGO A. USINA,
   THEODORE T. SNELL.